United States Patent
Dureau

(10) Patent No.: US 10,965,483 B2
(45) Date of Patent: *Mar. 30, 2021

(54) METHODS, SYSTEMS, AND MEDIA FOR MEDIA CONTENT STREAMING DEVICE SETUP

(71) Applicant: Google LLC, Mountain View, CA (US)

(72) Inventor: Vincent Dureau, San Fransico, CA (US)

(73) Assignee: Google LLC, Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/160,676

(22) Filed: Oct. 15, 2018

(65) Prior Publication Data

US 2019/0052477 A1 Feb. 14, 2019

Related U.S. Application Data

(63) Continuation of application No. 14/307,043, filed on Jun. 17, 2014, now Pat. No. 10,103,899.

(Continued)

(51) Int. Cl.
*G06F 15/173* (2006.01)
*H04L 12/28* (2006.01)
(Continued)

(52) U.S. Cl.
CPC ...... *H04L 12/2814* (2013.01); *H04L 29/1216* (2013.01); *H04N 21/43635* (2013.01); *H04L 2012/2849* (2013.01)

(58) Field of Classification Search
CPC .............. H04L 29/06; H04L 29/08072; H04L 12/2814; H04L 29/1216; H04L 2012/2849

(Continued)

(56) References Cited

U.S. PATENT DOCUMENTS

| 6,760,541 B1 | 7/2004 | Ohba |
| 6,791,974 B1 | 9/2004 | Greenberg |

(Continued)

FOREIGN PATENT DOCUMENTS

| CN | 2664317 | 12/2004 |
| CN | 101662656 | 3/2010 |

(Continued)

OTHER PUBLICATIONS

Examination Report dated Mar. 6, 2018 in EP Patent Application No. 14737452.4.

(Continued)

*Primary Examiner* — Khanh Q Dinh
(74) *Attorney, Agent, or Firm* — Byrne Poh LLP

(57) ABSTRACT

Systems, methods, and media for setting up a media content streaming device are provided. In some implementations, the systems comprise: a first communication interface that is configured to provide a media output to a media content presentation device; a second communication interface that is configured to transfer data; and a hardware processor that is configured to: retrieve a setup application in response to detecting a connection between the media content streaming device and a user device via the second communication interface; cause the setup application to be launched on the user device; receive, from the user device, information relating to setting up the media content streaming device; set up the media content streaming device based on the received information relating to setting up the media content streaming device; and prompt a user to connect the media content streaming device to the media content presentation device via the second communication interface.

20 Claims, 4 Drawing Sheets

Related U.S. Application Data

(60) Provisional application No. 61/835,853, filed on Jun. 17, 2013.

(51) Int. Cl.
*H04L 29/12* (2006.01)
*H04N 21/4363* (2011.01)

(58) Field of Classification Search
USPC .............................. 709/220, 224, 226, 228
See application file for complete search history.

(56) References Cited

U.S. PATENT DOCUMENTS

| | | | |
|---|---|---|---|
| 6,829,779 | B1 | 12/2004 | Perlman |
| 7,043,691 | B1 | 5/2006 | Kwon et al. |
| 7,395,339 | B2 | 7/2008 | Kirkland |
| 7,549,160 | B1 | 6/2009 | Podar et al. |
| 7,644,426 | B2 | 1/2010 | Suh |
| 7,647,413 | B2 | 1/2010 | Kirkland |
| 7,755,503 | B2 | 7/2010 | Bonorden et al. |
| 7,877,497 | B2 | 1/2011 | Kirkland |
| 8,325,236 | B2 | 12/2012 | Hallberg |
| 8,868,698 | B2 * | 10/2014 | Millington .......... H04L 12/2803 709/220 |
| 8,904,024 | B2 | 12/2014 | Kamath et al. |
| 9,015,745 | B2 * | 4/2015 | Sinha .................... G06T 1/0021 725/23 |
| 9,032,057 | B2 * | 5/2015 | Agarwal ................ H04L 63/08 709/223 |
| 9,253,229 | B1 | 2/2016 | Strothmann et al. |
| 9,319,409 | B2 * | 4/2016 | Pollock .............. H04N 21/4432 |
| 9,326,016 | B2 * | 4/2016 | Grasset ................ H04L 67/325 |
| 9,363,698 | B2 * | 6/2016 | Cirillo .................. G01R 13/029 |
| 9,363,709 | B2 * | 6/2016 | Vasisht ................ H04W 28/18 |
| 9,882,995 | B2 * | 1/2018 | Van Erven ......... H04N 21/6582 |
| 2002/0143805 | A1 * | 10/2002 | Hayes .................... G06F 1/1626 345/169 |
| 2005/0066229 | A1 | 3/2005 | Karaoguz et al. |
| 2005/0076153 | A1 | 4/2005 | Nedellec |
| 2005/0080496 | A1 * | 4/2005 | Hayes .................... G06F 1/1626 700/65 |
| 2005/0216606 | A1 * | 9/2005 | Hayes .................... G06F 1/1626 710/5 |
| 2006/0159109 | A1 * | 7/2006 | Lamkin ................ G11B 27/10 370/401 |
| 2008/0284909 | A1 | 11/2008 | Keohane et al. |
| 2009/0043998 | A1 * | 2/2009 | Doumuki ............ H04W 12/003 713/1 |
| 2011/0179204 | A1 | 7/2011 | Hulbert et al. |
| 2012/0246240 | A1 * | 9/2012 | Hanlon .................... G06F 16/48 709/206 |
| 2013/0012175 | A1 * | 1/2013 | Butterfield ........ H04M 3/42382 455/414.1 |
| 2013/0064132 | A1 * | 3/2013 | Low ...................... H04W 24/02 370/254 |
| 2013/0067041 | A1 * | 3/2013 | Low ...................... H04W 8/245 709/220 |
| 2013/0205322 | A1 * | 8/2013 | Sinha .................... G06T 1/0021 725/19 |
| 2014/0040495 | A1 | 2/2014 | Kamath et al. |
| 2014/0201330 | A1 | 7/2014 | Lopez et al. |
| 2014/0219088 | A1 | 8/2014 | Oyman et al. |

FOREIGN PATENT DOCUMENTS

| | | |
|---|---|---|
| CN | 102802059 | 11/2012 |
| WO | WO 2013048484 | 4/2013 |
| WO | WO 2013032945 | 6/2013 |

OTHER PUBLICATIONS

International Preliminary Report on Patentability dated Dec. 30, 2015 in International Patent Application No. PCT/US2014/042756.
International Search Report dated Sep. 2, 2014 in International Patent Application No. PCT/US2014/042756.
Notice of Allowance dated May 18, 2018 in U.S. Appl. No. 14/307,403.
Office Action dated Mar. 9, 2017 in U.S. Appl. No. 14/307,043.
Office Action dated Mar. 18, 2015 in U.S. Appl. No. 14/307,043.
Office Action dated Apr. 24, 2018 in CN Patent Application No. 201480034642.1.
Office Action dated Aug. 26, 2016 in U.S. Appl. No. 14/307,043.
Office Action dated Sep. 12, 2014 in U.S. Appl. No. 14/307,043.
Written Opinion dated Sep. 2, 2014 in International Patent Application No. PCT/US2014/042756.
Netgear, "Push2TV Wireless Display Adapter", User Manual, Model: PTV3000, Apr. 2013, pp. 1-52.
Office Action dated Feb. 17, 2020 in KR Patent Application No. 10-2016-7001427.

* cited by examiner

METHODS, SYSTEMS, AND MEDIA FOR MEDIA CONTENT STREAMING DEVICE SETUP

CROSS-REFERENCE TO RELATED APPLICATION

This application is a continuation of U.S. patent application Ser. No. 14/307,043, filed Jun. 17, 2014, which claims the benefit of U.S. Provisional Patent Application No. 61/835,853, filed Jun. 17, 2013, each of which is hereby incorporated by reference herein in its entirety.

TECHNICAL FIELD

The disclosed subject matter relates to methods, systems, and media for media content streaming device setup.

BACKGROUND

A media content streaming device can be used to discover, receive, process, convert, and/or render suitable media content, such as television programs, movies, cartoons, music sound effects, audio books, streaming live content, pay-per-view programs, on-demand programs (e.g., as provided in video-on-demand (VOD) systems), Internet content (e.g., streaming content, downloadable content, Webcasts, etc.), etc. The media content streaming device can also have multiple communication interfaces through which the media content streaming device can communicate with suitable networks and/or devices (e.g., such as a television device, a desktop computer, a laptop computer, etc.). A user may experience difficulty in setting up a media content streaming device and connecting the media content streaming device to other devices via proper communication interfaces.

Accordingly, new mechanisms for media content streaming device setup are desirable.

SUMMARY

Methods, systems, and media for media content streaming device setup are provided. In accordance with some implementations of the disclosed subject matter, systems for media content streaming device setup are provided, the systems comprising: a first communication interface that is configured to provide a media output to a media content presentation device; a second communication interface that is configured to transfer data; and a hardware processor that is configured to: retrieve a setup application in response to detecting a connection between the media content streaming device and a user device via the second communication interface; cause the setup application to be launched on the user device; receive, from the user device, information relating to setting up the media content streaming device; set up the media content streaming device based on the received information relating to setting up the media content streaming device; and prompt a user to connect the media content streaming device to the media content presentation device via the second communication interface.

In accordance with some implementations of the disclosed subject matter, methods for setting up a media content streaming device are provided, the methods comprising: providing a media output to a media content presentation device via a first communication interface of the media content streaming device; retrieving a setup application in response to detecting a connection between the media content streaming device and a user device via a second communication interface of the media content streaming device, wherein the second communication interface is configured to transfer data; causing the setup application to be launched on the user device; receiving, from the user device, information relating to setting up the media content streaming device; setting up the media content streaming device based on the received information relating to setting up the media content streaming device; and prompting, using a hardware processor, a user to connect the media content streaming device to the media content presentation device via the second communication interface.

In accordance with some implementations of the disclosed subject matter, non-transitory computer-readable media are provided containing computer-executable instructions that, when executed by a processor, cause the processor to perform a method for setting up a media content streaming device are provided, the method comprising: providing a media output to a media content presentation device via a first communication interface of the media content streaming device; retrieving a setup application in response to detecting a connection between the media content streaming device and a user device via a second communication interface of the media content streaming device, wherein the second communication interface is configured to transfer data; causing the setup application to be launched on the user device; receiving, from the user device, information relating to setting up the media content streaming device; setting up the media content streaming device based on the received information relating to setting up the media content streaming device; and prompting a user to connect the media content streaming device to the media content presentation device via the second communication interface.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
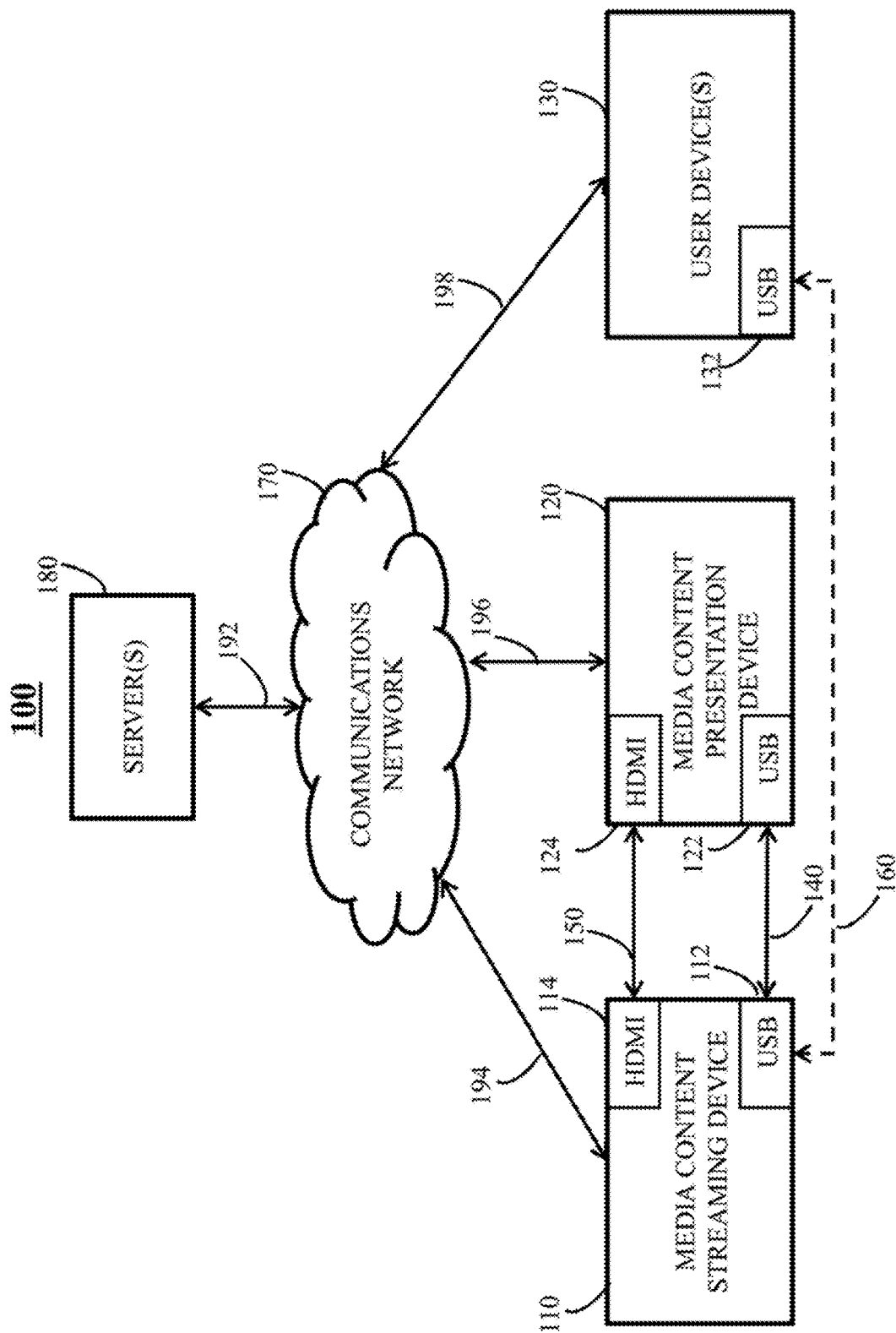
FIG. 1 is an example of a system for media content streaming device setup in accordance with some implementations of the disclosed subject matter.

In accordance with various implementations, as described in more detail below, mechanisms, which can include methods, systems, computer readable media, etc., for media content streaming device setup are provided. The mechanisms can be used to assist a user in setting up a media content streaming device.

In some implementations, the media content streaming device can include one or more suitable communication interfaces for interfacing with one or more communication networks and/or devices, such as Universal Serial Bus (USB) interfaces, High-Definition Multimedia Interfaces (HDMI), Wifi interfaces, RCA interfaces, optical interfaces, Digital Visual Interfaces (DVI), Video Graphics Array (VGA), audio interfaces, etc.

In some implementations, the media content streaming device can be connected to a media content presentation device (e.g., such as a television device, etc.) through one or more suitable communication interfaces. For example, the media content streaming device can be connected to the media content presentation device through an HDMI connection (e.g., via a suitable HDMI cable, etc.). In some implementations, the media content streaming device can provide the media content presentation device with suitable media content (e.g., such as video content, audio content, etc.) through the HDMI connection. In a more particular example, the media content streaming device can transfer compressed and/or uncompressed video and/or audio data to the media content presentation device through the HDMI connection. In some implementations, the media content streaming device can also draw power from the media content presentation device through the HDMI connection. In a more particular example, the media content presentation device can provide power to the media content streaming device through a Mobile High-Definition Link (MHL).

As another example, the media content streaming device can be connected to the media content presentation device through a USB interface (e.g., via a suitable USB cable, etc.). In some implementations, the media content streaming device can draw power from the media content presentation device through the USB interface.

In some implementations, a user may connect the media content streaming device to a user device (e.g., such as a desktop computer, a laptop computer, a tablet computer, etc.) through the USB interface. Upon a USB connection being established between the media content streaming device and the user device through the USB interface, the mechanisms can detect the USB connection.

In some implementations, the mechanisms can then cause a setup application to be downloaded and installed on the user device. For example, the mechanisms can retrieve the setup application from the media content streaming device and cause the setup application to be installed on the user device automatically. As another example, the mechanisms can prompt a user to download the setup application from a server (e.g., through a suitable Internet connection, etc.). The mechanisms can then prompt the user to install the setup application manually.

In some implementations, the mechanisms can prompt the user to establish one or more suitable connections between the media content streaming device and the media content presentation device. For example, the mechanisms can present one or more suitable interfaces to prompt the user to connect the media content streaming device and the media content presentation device using any suitable interfaces, such as a USB interface, an HDMI, etc.

The mechanisms can also receive information relating to setting up the media content streaming device. For example, the mechanisms can retrieve information relating to network configurations (e.g., the name of a network, the security key requested to connect to the network, etc.) from the user device. As another example, the mechanisms can prompt the user to provide suitable information that can be used to set up the media content streaming device, such as information relating to network configurations (e.g., the name of a network, the security key requested to connect to the network, etc.), information about user preferences (e.g., a desired video quality, a desired audio quality, a desired aspect ratio, etc.), etc.

In some implementations, the mechanisms can store the received information in a suitable storage device (e.g., such as a storage device of the media content streaming device). In some implementations, such information (e.g., information relating to network configurations, user preferences, etc.) can be used to set up the media content streaming device. In a more particular example, one or more suitable network connections (e.g., WiFi, LAN, etc.) can be established based on the information relating to network configurations, such as the information relating to the name of a network, the security type of the network, the security key requested to connect to the network, etc.

Turning to FIG. 1, an example 100 of a system for media content streaming device setup in accordance with some implementations of the disclosed subject matter is shown. As illustrated, system 100 can include a media content streaming device 110, a media content presentation device 120, one or more user devices 130, a communications network 170, one or more servers 180, and communications links 140, 150, 160, 192, 194, 196, and 198.

Media content streaming device 110 can be any suitable device that is capable of receiving, processing, converting, and/or rendering media content, such as a set-top box, a media receiver, a game console, a laptop computer, a desktop computer, a tablet computer, a mobile phone, a gaming console, etc.

As referred to herein, media content can include television programs, movies, cartoons, music sound effects, audio books, streaming live content, pay-per-view programs, on-demand programs (e.g., as provided in video-on-demand (VOD) systems), Internet content (e.g., streaming content, downloadable content, Webcasts, etc.), etc.

Media content presentation device 120 can be any suitable device that is capable of receiving, converting, processing, and/or displaying media content, such as a streaming media player, a media center computer, a CRT display, a LCD, a LED display, a plasma display, a touch-screen display, a simulated touch screen, a television device, a tablet user device, a mobile phone, a gaming console, etc. In some implementations, media content presentation device 120 can be three-dimensional capable.

User device(s) 130 can include any suitable devices that are capable of receiving user inputs, such as a tablet computer, a laptop computer, a desktop computer, a personal data assistant (PDA), a portable email device, a gaming console, etc.

Server(s) 180 can be any suitable server for providing media content, providing setup applications, and/or for performing any other suitable functions. Server(s) 180 can be implemented using any suitable components. For example, each of the server(s) 180 can be implemented as a hardware processor, a computer, a data processing device, a tablet user device, a multimedia terminal, a mobile telephone, a gaming device, a set-top box, a television, etc., or a combination of such devices.

In some implementations, each of media content streaming device 110, media content presentation device 120, and user device 130 can include one or more suitable communication interfaces for interfacing with one or more communication networks and/or devices. For example, the interfaces can include Universal Serial Bus (USB) interfaces, High-Definition Multimedia Interfaces (HDMI), Digital Video Interfaces (DVI), WiFi interfaces, Ethernet interfaces, RCA interfaces, optical interfaces, Video Graphics Array (VGA), audio interfaces, etc. In a more particular example, as illustrated in FIG. 1, media content streaming device 110 can include a USB port 112 and an HDMI port 114. Similarly, media content presentation device 120 can include a USB port 122 and an HDMI port 124 and user device(s) 130 can include a USB port 132.

In some implementations, media content streaming device 110 and media content presentation device 120 can be connected through communication links 140 and 150. More particularly, USB port 112 of media content streaming device 110 can be coupled to USB port 122 of media content presentation device 120 through communication link 140 (e.g., via a suitable USB cable). HDMI port 114 of media content streaming device 110 can be coupled to HDMI port 124 of media content presentation device 120 through communication link 150 (e.g., via a suitable HDMI cable). In some implementations, media content streaming device 110 can draw power from media content presentation device 120 through communication link 140 and/or communication link 150. In some implementations, a user can be prompted to couple USB port 112 to USB port 122 to set up media content streaming device 110.

In some implementations, media content streaming device 110 can be connected to user device(s) 130 through communication link 160. More particularly, for example, USB port 112 can be coupled to USB port 132 through communication link 160 (e.g., via a suitable USB cable). In some implementations, media content streaming device 110 may not intended to be connected to user device(s) 130 via a USB connection at one or more times. Nevertheless, a user can be able to couple USB port 112 to USB port 132 (e.g., using a suitable USB cable).

Each of media content streaming device 110, media content presentation device 120, user device 130, and server 180 can include and/or be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. Moreover, each of media content streaming device 110, media content presentation device 120, user device 130, and server 180 can include a hard drive, a digital video recorder, a solid state storage device, a removable storage device, and/or any other suitable storage device. Each of media content streaming device 110, media content presentation device 120, user device 130, and server 180 implemented as a stand-alone device or integrated with other components of system 100.

Communications network 170 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

Server(s) 180, media content streaming device 110, media content presentation device 120, and computing device 130 can be connected to communications network 170 through communications links 192, 194, 196, and 198, respectively. Communication links 192, 194, 196, and 198 can be any suitable communication links, such as network links, dial-up links, wireless links, hard-wired links, any other suitable communication links, or a combination of such links.

Figure 2:
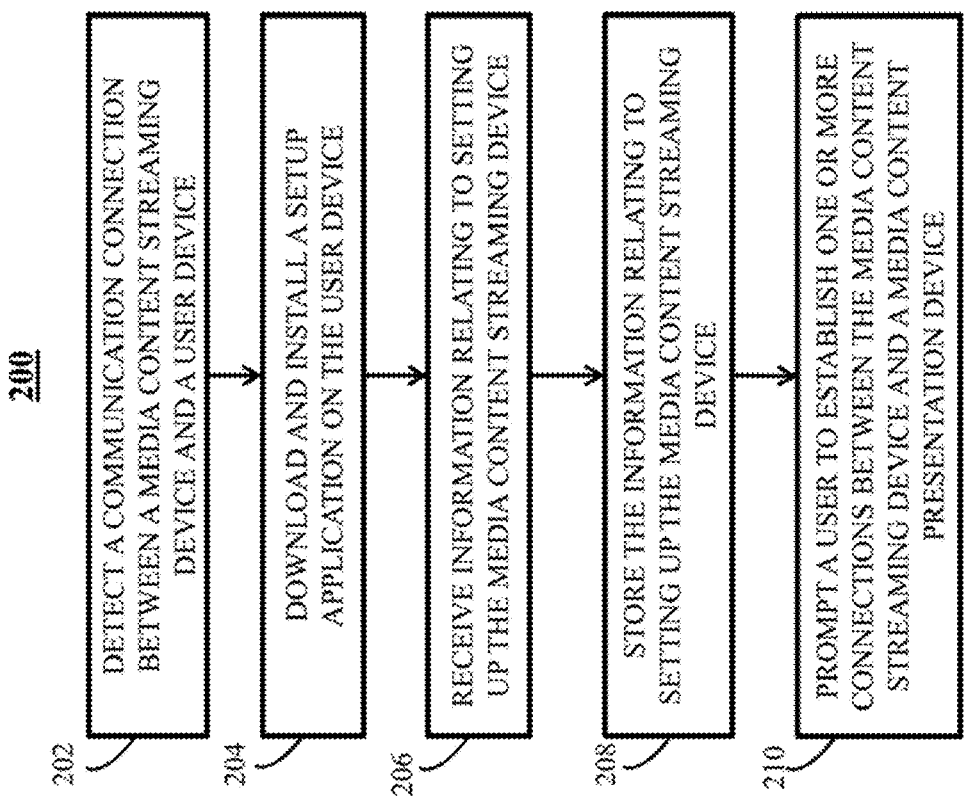
FIG. 2 is an example of a process for setting up a media content streaming device in accordance with some implementations of the disclosed subject matter.

Turning to FIG. 2, an example 200 of a process for setting up a media content streaming device in accordance with some implementations of the disclosed subject matter is shown.

As illustrated, beginning at 202, a user device can detect a communication connection between the user device and a media content streaming device. The communication connection can be detected in any suitable manner. For example, the user device can receive a signal at a particular communication interface of the user device. The user device can then determine that a communication connection has been established through the particular communication interface. In a more particular example, the user device can detect a signal at a USB port (e.g., a high on a pin of the USB port) and determine that a USB connection has been established between the user device and the media content streaming device.

In some implementations, the user device can also identify the media content streaming device that is connected to the user device through the particular communication interface (e.g., such as the USB interface or any suitable interface). For example, the device can be identified as a particular type of media content streaming device in the case where the user device is connected to the media content streaming device through the particular communication interface. The device can be identified in any suitable manner. For example, the user device can identify the device based on one or more suitable descriptors, such as device descriptors, configuration descriptors, interface descriptors, etc. In a more particular example, the user device can obtain information relating to the type of the device (e.g., such as a television, a desktop computer, a laptop computer, a camera, etc.), the manufacturer of the device, etc. based on the device descriptor of the device connected to the user device.

Next, at 204, the user device can download and install a setup application on the user device. The setup application can be downloaded in any suitable manner. For example, in response to detecting the communication connection (e.g., the USB connection), the user device can download the setup application from the media content streaming device through the communication connection. In a more particular example, the user device can retrieve the setup application from a storage device of the media content streaming device.

As another example, the setup application can be downloaded from a server (e.g., through a suitable Internet connection, etc.). In a more particular example, the user device can prompt a user to download the setup application to the user device. The user can be prompted to download the set up application in any suitable manner. For example, the user device can cause one or more suitable interfaces to be presented to the user. The interfaces can include any suitable information relating to the setup application, such as a description of the setup application, one or more URLs linking to one or more webpages from which the setup application can be downloaded, etc.

In some implementations, upon downloading the setup application to the user device as described above, the setup application can be installed in any suitable manner. For example, the setup application can be installed automatically. As another example, the user can be prompted to install the setup application manually by following a set of instructions presented using one or more suitable interfaces.

At 206, the user device can receive information relating to setting up the media content streaming device. The information can include any suitable information that can be used to set up the media content streaming device, such as information relating to network configurations (e.g., the name of a network, the security type of the network, the security key requested to connect to the network, etc.), user preferences (e.g., a desired video quality, a desired audio quality, a desired aspect ratio, etc.), etc.

In some implementations, the information relating to setting up the media content streaming device can be received in any suitable manner. For example, the user device can determine that such information is stored in a storage device of the user device. The user device can then present one or more suitable interfaces to the user to request permission to access such information (e.g., data about network configurations, such as the name of a network, the security type of the network, the security key requested to connect to the network, etc.) that is stored in the storage device. In response to the user providing authorization to access such information, the user device can retrieve the information from the storage device.

As another example, the user device can prompt the user to input information relating to setting up network connections for the media content streaming device. More particularly, for example, the user device can present one or more suitable interfaces to the user to allow the user to input information relating to network configurations (e.g., network name, security type, security key, etc. of a network connection), user preferences (e.g., a desired video quality, a desired audio quality, a desired aspect ratio, etc.), etc.

Next, at 208, the user device can store the received information relating to setting up the media content streaming device. The received information can be stored in any suitable manner. For example, the received information can be transferred to the media content streaming device through a suitable communication link between the media content streaming device and the user device. In a more particular example, the received information can be transferred to the media content streaming device through the USB connection that connects the media content streaming device to the user device. The information can then be stored in a suitable storage device of the media content streaming device and can be used to set up the media content streaming device.

At 210, the user device can prompt the user to establish one or more suitable connections between the media content streaming device and a media content presentation device. The user can be prompted to establish such connections in any suitable manner. For example, the user device can cause one or more suitable instructions to be presented to the user to prompt the user to connect the media content streaming device to the media content presentation device via one or more suitable communication interfaces. In some implementations, the instruction(s) can be presented using any suitable media content, such as one or more of audio content, video content, text, graphics, multimedia content, captioning content, and/or any other suitable content. In some implementations, the instruction(s) can be presented in the form of one or more linear presentations, interactive presentations, step-by-step instructions, and/or in any other suitable manner.

Figure 3:
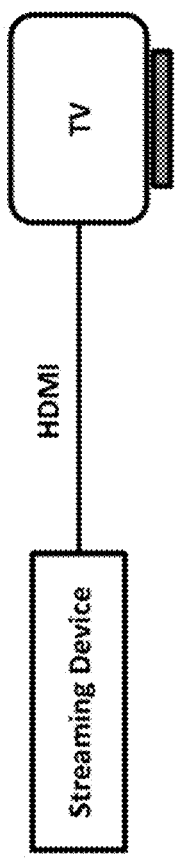
FIG. 3 is an example of an interface for prompting a user to connect a media content streaming device to a media content presentation device through an HDMI connection in accordance with some implementations of the disclosed subject matter.
Figure 4:
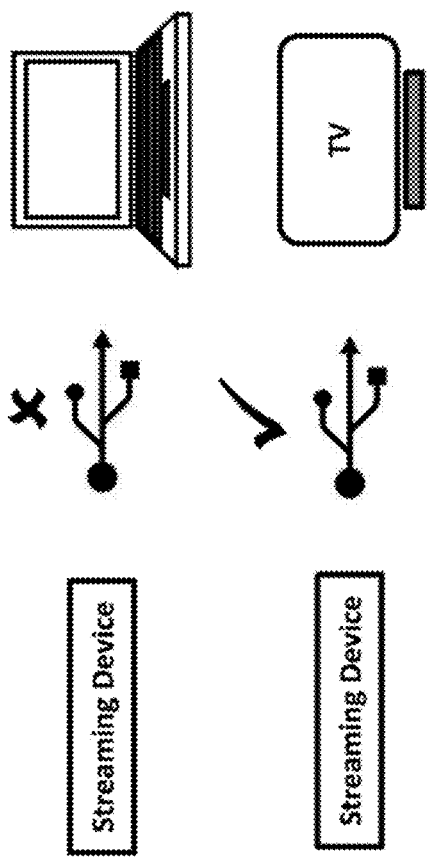
FIG. 4 is an example of an interface for prompting a user to connect a media content streaming device to a media content presentation device through a USB connection in accordance with some implementations of the disclosed subject matter.

In a more particular example, as illustrated in FIG. 3, an interface 300 can be presented to the user to prompt the user to connect the media content streaming device to the media content presentation device using an HDMI cable. In another more particular example, as illustrated in FIG. 4, an interface 400 can be presented to the user to prompt the user to disconnect the user device from the media content streaming device and connect the media content streaming device to the media content presentation device using a suitable USB cable.

In some implementations, the media content streaming device can be set up based on the information relating to setting up the media content streaming device that is obtained by the user device. For example, one or more suitable network connections (e.g., WiFi, LAN, etc.) can be established based on the information relating to network configurations, such as the information relating to the name of a network, the security type of the network, the security key requested to connect to the network, etc.

In some implementations, the user device and/or the media content streaming device can detect automatically that one or more steps have been completed successfully to set up the media content streaming device. For example, the user device can detect that the media content streaming device is connected to a suitable network (e.g., a WiFi network). As another example, the media content streaming device can detect that it has been connected to a media content presentation device via an HDMI link. In such an example, the media content streaming device can notify the user device about the detection via a USB link and/or any other suitable communication link.

It should be understood that the above steps of the flow diagrams of FIG. 2 can be executed or performed in any order or sequence not limited to the order and sequence shown and described in the figures. Also, some of the above steps of the flow diagrams of FIG. 2 can be executed or performed substantially simultaneously where appropriate or in parallel to reduce latency and processing times. Furthermore, it should be noted that FIG. 2 are provided as examples only. At least some of the steps shown in these figures may be performed in a different order than represented, performed concurrently, or altogether omitted.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems discussed herein collect personal information about users, or may make use of personal information, the users may be provided with an opportunity to control whether programs or features collect user information (e.g., information about a user's social network, social actions or activities, profession, a user's preferences, a user's current location, or a user's credentials to log into a service), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for media content streaming device setup are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A media content streaming device, comprising:
a first communication interface that is configured to provide a media output to a media content presentation device;
a storage device configured to store a setup application and user specified information relating to setting up the media content streaming device;
a second communication interface that is connected to the storage device and configured to (i) establish a connection with a computing device and (ii) cause a user interface to be presented on the computing device for inputting network configuration information associated with the computing device; and
a hardware processor that is configured to connect the media content streaming device to a network based on the network configuration information associated with the computing device and to use the network connected to based on network configuration information received via the user interface presented on the computing device when the media content streaming device is connected to the media content presentation device.

2. The media content streaming device of claim 1, wherein the second communication interface is further configured to transfer a setup application from the storage device to the computing device using the connection with the computing device so that the setup application will be launched on the computing device.

3. The media content streaming device of claim 2, wherein the user specified information is input via the user interface presented on the computing device using the setup application and wherein the user specified information includes the network configuration information associated with the computing device.

4. The media content streaming device of claim 2, wherein the user specified information is input via the user interface presented on the computing device using the setup application and wherein the user specified information includes user preferences regarding media quality.

5. The media content streaming device of claim 1, wherein the first communication interface comprises at least one of an HDMI interface, a RCA interface, an optical interface, a DVI interface, a VGA interface, and an audio interface.

6. The media content streaming device of claim 1, wherein the second communication interface is a USB interface.

7. A method for setting up a media content streaming device, the method comprising:
providing a media output to a media content presentation device via a first communication interface of the media content streaming device;
storing a setup application on a storage device of the media content streaming device;
establishing, via a second communication interface that is connected to the storage device, a connection with a computing device;
causing a user interface to be presented on the computing device for inputting network configuration information associated with the computing device; and
connecting the media content streaming device to a network based on the network configuration information associated with the computing device and to use the network connected to based on network configuration information received via the user interface presented on the computing device when the media content streaming device is connected to the media content presentation device.

8. The method of claim 7, further comprising transferring the setup application from the storage device of the media content streaming device to the computing device via the second communication interface of the media content streaming device so that the setup application will be launched on the computing device.

9. The method of claim 8, further comprising receiving, from the computing device via the second communication interface, user specified information relating to setting up the media content streaming device that is input via the user interface presented on the computing device using the setup application, wherein the user specified information includes the network configuration information associated with the computing device.

10. The method of claim 9, further comprising storing the received information relating to setting up the media content streaming device on the storage device of the media content streaming device.

11. The method of claim 8, receiving, from the computing device via the second communication interface, user specified information relating to setting up the media content streaming device that is input via the user interface presented on the computing device using the setup application, wherein the user specified information includes user preferences regarding media quality.

12. The method of claim 7, wherein the first communication interface comprises at least one of an HDMI interface, a RCA interface, an optical interface, a DVI interface, a VGA interface, and an audio interface.

13. The method of claim 7, wherein the second communication interface is a USB interface.

14. A non-transitory computer-readable medium containing computer executable instructions that, when executed by a processor, cause the processor to perform method for setting up a media content streaming device, the method comprising:
providing a media output to a media content presentation device via a first communication interface of the media content streaming device;

storing a setup application on a storage device of the media content streaming device;

establishing, via a second communication interface that is connected to the storage device, a connection with a computing device;

causing a user interface to be presented on the computing device for inputting network configuration information associated with the computing device; and connecting the media content streaming device to a network based on the network configuration information associated with the computing device and to use the network connected to based on network configuration information received via the user interface presented on the computing device when the media content streaming device is connected to the media content presentation device.

15. The method of claim 14, further comprising transferring the setup application from the storage device of the media content streaming device to the computing device via the second communication interface of the media content streaming device so that the setup application will be launched on the computing device.

16. The method of claim 15, further comprising receiving, from the computing device via the second communication interface, user specified information relating to setting up the media content streaming device that is input via the user interface presented on the computing device using the setup application, wherein the user specified information includes the network configuration information associated with the computing device.

17. The method of claim 16, further comprising storing the received information relating to setting up the media content streaming device on the storage device of the media content streaming device.

18. The method of claim 15, receiving, from the computing device via the second communication interface, user specified information relating to setting up the media content streaming device that is input via the user interface presented on the computing device using the setup application, wherein the user specified information includes user preferences regarding media quality.

19. The method of claim 14, wherein the first communication interface comprises at least one of an HDMI interface, a RCA interface, an optical interface, a DVI interface, a VGA interface, and an audio interface.

20. The method of claim 14, wherein the second communication interface is a USB interface.

* * * * *